(12) United States Patent
Franz et al.

(10) Patent No.: US 6,810,899 B2
(45) Date of Patent: Nov. 2, 2004

(54) INTEGRATED PALLADIUM-BASED MICROMEMBRANES FOR HYDROGEN SEPARATION AND HYDROGENATION/ DEHYDROGENATION REACTIONS

(75) Inventors: Aleksander J. Franz, Winchester, MA (US); Klavs F. Jensen, Lexington, MA (US); Martin A. Schmidt, Reading, MA (US); Samara Firebaugh, Annapolis, MD (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/372,885

(22) Filed: Feb. 24, 2003

(65) Prior Publication Data

US 2004/0028602 A1 Feb. 12, 2004

Related U.S. Application Data (63) Continuation of application No. 09/453,246, filed on Dec. 2, 1999, now Pat. No. 6,541,676.
(60) Provisional application No. 60/110,687, filed on Dec. 2, 1998.

(51) Int. Cl.[7] .......................... B01D 53/22; B05D 3/00; B32B 3/00; F16K 17/38
(52) U.S. Cl. ................... 137/79; 96/11; 216/2; 216/79; 216/99; 427/275; 427/276; 427/307; 427/596; 428/315.5; 428/315.9; 428/469
(58) Field of Search .................. 95/56; 96/11; 423/351, 423/648.1, 652, 659; 428/315.5, 469, 315.9; 427/596, 275, 276, 307; 216/2, 33, 56, 79, 99, 27; 137/79

(56) References Cited

U.S. PATENT DOCUMENTS 2,332,596 A   10/1943   Pearson 3,092,517 A   6/1963   Oswin
3,428,476 A   2/1969   Langley et al.
3,505,180 A   4/1970   Brogden (List continued on next page.)

FOREIGN PATENT DOCUMENTS

| CA | 579535 | 7/1959 |
|----|--------|--------|
| GB | 1286670 | 8/1972 |
| GB | 1292025 | 10/1972 |
| JP | 53-43153 | 11/1978 |
| JP | 53-47792 | 12/1978 |
| JP | 61-209005 | 9/1986 |
| JP | 62-273029 | 11/1987 |
| JP | 62-273030 | 11/1987 |
| JP | 64-4216 | 1/1989 |
| WO | WO 97/49475 A1 | 12/1997 |

OTHER PUBLICATIONS

Basile et al., "Membrane reactor for water gas shift reaction," Gas Separation & Purification, vol. 10, No. 4, pp. 243–254, (Dec.) 1996, Abstract.

(List continued on next page.)

*Primary Examiner*—Wayne A. Langel
(74) *Attorney, Agent, or Firm*—Wolf, Greenfield & Sacks, PC (57) ABSTRACT

The present invention relates to gas separation membranes including a metal-based layer having sub-micron scale thicknesses. The metal-based layer can be a palladium alloy supported by ceramic layers such as a silicon oxide layer and a silicon nitride layer. By using MEMS, a series of perforations (holes) can be patterned to allow chemical components to access both sides of the metal-based layer. Heaters and temperature sensing devices can also be patterned on the membrane. The present invention also relates to a portable power generation system at a chemical microreactor comprising the gas separation membrane. The invention is also directed to a method for fabricating a gas separation membrane. Due to the ability to make chemical microreactors of very small sizes, a series of reactors can be used in combination on a silicon surface to produce an integrated gas membrane device.

44 Claims, 9 Drawing Sheets

U.S. PATENT DOCUMENTS

| | | | |
|---|---|---|---|
| 4,551,220 | A | 11/1985 | Oda et al. |
| 4,857,080 | A | 8/1989 | Baker et al. |
| 5,160,618 | A | 11/1992 | Burggraaf et al. |
| 5,215,729 | A | 6/1993 | Buxbaum |
| 5,282,948 | A | 2/1994 | Cole et al. |
| 5,338,430 | A | 8/1994 | Parsonage et al. |
| 5,385,709 | A | 1/1995 | Wise et al. |
| 5,459,099 | A | 10/1995 | Hsu |
| 5,503,729 | A | 4/1996 | Elyanow et al. |
| 5,511,428 | A | 4/1996 | Goldberg et al. |
| 5,645,684 | A | 7/1997 | Keller |
| 5,652,020 | A | 7/1997 | Collins et al. |
| 5,677,560 | A | 10/1997 | Zimmer et al. |
| 5,683,828 | A | 11/1997 | Spear et al. |
| 5,734,092 | A | 3/1998 | Wang et al. |
| 5,753,014 | A | 5/1998 | Van Rijn |
| 5,759,493 | A | 6/1998 | Raisanen |
| 5,786,235 | A | 7/1998 | Eisele et al. |
| 5,789,024 | A | 8/1998 | Levy et al. |
| 5,801,070 | A | 9/1998 | Zanini-Fisher et al. |
| 5,811,062 | A | 9/1998 | Wegeng et al. |
| 6,541,676 | B1 | 4/2003 | Franz et al. |

OTHER PUBLICATIONS

Bryden et al., "Nanostructured Palladium Membrane Synthesis by Magnetron Sputtering," Materials Science and Engineering A–Structual Materilas Properties Microstructure and Processing, vol. 204, No. 1–2, pp. 140–145, (Dec.)1995, Abstract.

Firebaugh et al., "Investigation of High–Temperature Degradation of Platinum Thin Films with an *In Situ* Resistance Measurement Apparatus," Journal of Microelectromechanical Systems, vol. 7, No. 1, pp. 128–135, 3/98.

Franz et al., "Palladium Based Micromembranes for Hydrogen Separation and Hydrogenation/dehydrogenation Reactions," IEEE International Microelectromechanical Systems Conference, New York, NY, pp. 382–387, 1999, no month.

Jayaraman et al. "Hydrogen permeation through ultrathin metallic membranes," 3rd International Conference on Inorganic Membranes, Worcester, MA, p. 1, paper 55, Jul. 10–14, 1994, Abstract.

Jayaraman et al., "Fabrication of ultrathin metallic membranes on ceramic supports by sputter deposition," Journal of Membrane Science, vol. 99, No. 1, pp. 89–100, Feb. 14, 1995.

Jayaraman et al., "Synthesis and hydrogen permeation properties of ultrathin palladium–silver alloy membranes," Journal of Membrane Science, vol. 104, No. 3, pp. 251–262, Aug. 31, 1995.

Lang, W. "Silicon microstructuring technology," Materials Science and Engineering, vol. R17, pp. 1–55, 1996, no month.

Mordkovich et al., "The Large–Scale Production of Hydrogen from Gas–Mixtures—A Use for Ultra–Thin Palladium Alloy Membranes," Intl. J. of Hydrogen Energy, vol. 18, No. 7, pp. 539–544, (Jul.) 1993, Abstract.

Shu et al., "Hysteresis in Hydrogen Permeation through Palladium Membranes," J. of the Chemical Soc., vol. 92, No. 15, pp. 2745–2751, (Aug. 7) 1996, Abstract.

Shu et al., "Structurally Stable Composite Pd–Ag Alloy Membranes–Introduction of a Diffusion Barrier," Thin Solid Films, vol. 286, No. 1–2, pp. 72–79, (Sep. 30) 1996, Abstract.

Srinivasan et al., "Micromachined Reactors for Catalytic Partial Oxidation Reactions," AIChE Journal, vol. 43, No. 11, pp. 3059–3069, Nov. 1997.

Uemiya et al., "Composite membranes of Group VIII metal supported on porous alumina," AIChE Journal, vol. 43:11A, pp. 2715–2723, 1997, Abstract, no month.

Uemiya et al., "Preparation of highly permeable membranes for hydrogen Separation using a CVD technique," 3rd International Conference on Inorganic Membranes, Worcester, MA, p. 1, paper 58, Jul. 10–14, 1994, Abstract.

Xomeritakis et al. & Y.S. Lin, "Fabrication of thin metallic membranes by MOCVD and sputtering," Journal of Membrane Science, vol. 133, pp. 217–230, 1997, no month.

Ye et al., "Preparation of ultrathin palladium membrane," Proceedings of the 2nd International Conference on Inorganic Membranes, vol. 61–62, pp. 437–442, 1991, Abstract, no month.

Research proposal abstract: Hydrogen production processes over thin metal films, sponsoring org. Statens Energiverk, Stockholm, Sweden, Apr. 1991 to Mar. 1993.

Research proposal abstract: Ultrathin Metal Membranes, Membrane Technology & Research Inc., USDOE Energy Research, Jul. 1997 to Oct. 1993.

National Chemical Lab Forms Ultra–Thin Palladium Thin Film on Alumina Substrate,Comline Chemicals & Materials, Japan, p. 4, Oct. 6, 1989, Abstract.

INTEGRATED PALLADIUM-BASED MICROMEMBRANES FOR HYDROGEN SEPARATION AND HYDROGENATION/ DEHYDROGENATION REACTIONS

RELATED APPLICATIONS

This application claims the benefit of priority under 35 U.S.C. §120 and is a continuation of U.S. patent application Ser. No. 09/453,246, filed Dec. 2, 1999, now U.S. Pat. No. 6,541,676, which application claims the benefit of priority under 35 U.S.C. §119(e) of co-pending U.S. Provisional Patent Application Ser. No. 60/110,687, filed Dec. 2, 1998. All of these applications are hereby incorporated by reference.

FEDERALLY SPONSORED RESEARCH

This invention was made with government support under Grant Number F30602-97-2-010 awarded by the Air Force. The government has certain rights in the invention.

FIELD OF THE INVENTION

The present invention relates to separation membranes and, in particular, membranes for the purification of hydrogen. The membranes involve a metal-based layer having sub-micron scale thicknesses, and methods for the preparation of these membranes and miniature devices incorporating these membranes are disclosed. In addition, the membranes can be used to effect chemical reactions such as hydrogenation and dehydrogenation reactions.

BACKGROUND OF THE INVENTION

Much effort has been placed on developing synthetic membranes for applications such as (1) the separation of chemical components and (2) the catalysis of chemical reactions. Like their biological counterparts, synthetic membranes form an interface between two regions. One application for the membranes involves the separation and/or purification of gases. The capability to provide high purity gases is beneficial for certain devices such as fuel cells. The leading fuel cell technology involves a reaction between feed hydrogen and oxygen sources to generate power. As the purity of the hydrogen gas source increases, fuel cells generally display improved efficiencies because impurities such as carbon monoxide, which can poison fuel cells, are substantially eliminated from the feed.

Membranes can also be used to effect chemical reactions in a manner similar to heterogeneous catalysts. Membranes are distinguished from heterogeneous catalysts, however, in that membranes can also function as an interface between reactants and products or between impure component mixtures and the resulting purified component, and thus membranes can provide a dual catalyst/purification function. For example, the purification step can involve contacting an impure source of hydrogen gas with one side of a membrane layer and causing purer hydrogen gas to exit through the other side. By providing a reagent capable of undergoing hydrogenation on the other side, hydrogenation can occur with this purified source of hydrogen in the presence of a catalytically active metal surface. Dehydrogenation reactions can also occur at membrane surfaces, where membranes provide the added benefit of separating the hydrogen gas released from the reaction from the dehydrogenated product.

In addition, higher selectivity can be achieved with membrane catalysts. For example, typical hydrogenation reactions occur in the presence of a large excess of hydrogen gas. Because hydrogen transport through metal layers or membranes is diffusion-limited, the rate of hydrogen exiting the membrane can be maintained at relatively low concentrations. Thus, by using a membrane as a catalyst, a large excess of the reactant can be placed on the other side of the membrane layer, i.e., the side opposite a source of impure hydrogen gas, which can consequently react with a relatively low concentration hydrogen stream exiting through the membrane.

There exists a need to miniaturize membrane systems to produce more portable devices such as chemical devices which can include fuel cells or microreactors. Applications for such portable power generation systems span a wide range of technologies from military/defense to automotive. For example, in the U.S. Armed Forces, the operating power requirement for equipment of a dismounted soldier is outgrowing the capacity of batteries to supply that power, driving interest in man-portable chemical or hybrid power sources. In the case of the automotive industry, stricter emission limits, as well as concerns with greenhouse emissions are driving research into electric-powered cars. Most electric car designs include a miniature hydrogen generation plant combined with fuel cells to convert hydrogen into electricity.

One major obstacle in using devices such as fuel cells is the storage of hydrogen. Hydrogen storage for portable or mobile power sources presents a difficult challenge due to the low compressibility of hydrogen gas. In addition, large volumes of stored hydrogen gas can present a safety hazard. Some car manufacturers have diverted attention away from hydrogen fuel sources to methanol storage instead, and a number of small methanol reforming systems have been developed for use in cars. These systems can weigh about 200 lbs, however, which would not be practical for more portable applications.

Certain prior efforts to miniaturize membranes, i.e. provide membranes having smaller thicknesses, have involved porous membranes. Porous membranes are typically more fragile than solid layers. For example, U.S. Pat. No. 4,857,080 discloses depositing a metal on a microporous support to result in a layer having a thickness of less than 0.5 $\mu$m. The layer can be strengthened with an overcoat "to protect the fragile surface." U.S. Pat. No. 5,160,618 discloses porous inorganic membranes having thicknesses of less than 0.5 $\mu$m for separating oxygen from oxygen-containing gaseous mixtures. U.S. Pat. No. 5,652,020 relates to hydrogen-selective membranes but the thicknesses achieved are between 10 $\mu$m and 20 $\mu$m. U.S. Pat. No. 5,734,092 discloses a macroscale palladium layer containing microfine channels that allow diffusion of hydrogen gas.

The ability to miniaturize membrane systems can eventually lead to new applications in membrane technologies and improvements in already existing technologies. Much work still needs to be achieved in providing thin membrane layers. One major obstacle lies in the requirement that in many cases membranes must be constructed to withstand pressure differences between an area of high gas pressure, e.g. the incoming gas source, and relatively low gas pressure, e.g. the outgoing, purified gas. Known membranes having micron-scale dimensions typically are unable to withstand the pressure differences required for gas separation or chemical catalysis applications.

SUMMARY OF THE INVENTION

The present invention provides a membrane incorporating a metal-based layer having sub-micron scale dimensions. Devices incorporating micromembranes are disclosed as well as methods for performing selective hydrogenation/dehydrogenation reactions and corresponding microreactors that can catalyze these reactions by using the micromembranes of the present invention.

One aspect of the invention provides a gas separation membrane comprising at least one support layer and a metal-based layer positioned adjacent the support layer. The metal-based layer has a thickness of less than about 1 $\mu$m and is capable of performing gas separation or catalysis.

Another aspect of the invention provides an integrated gas separation membrane comprising at least one insulating support layer having first and second portions. The first portion is positioned adjacent a silicon surface. A metal-based layer is positioned adjacent the second portion of the support layer.

Another aspect of the invention provides a method for fabricating a gas separation membrane. The method comprises providing at least one insulating support layer and patterning holes in the at least one support layer. A metal-based layer is deposited adjacent this support layer, where the metal-based layer has a thickness of less than about 1 $\mu$m.

Another aspect of the invention provides a method comprising providing a membrane having at least one support layer positioned adjacent a metal-based layer. The metal-based layer has an active surface and the metal-based layer has a thickness of less than about 1 $\mu$m. The method involves chemically reacting at least one reagent at the active surface.

Another aspect of the invention provides a portable power generation system. The system comprises at least one gas separation membrane. Each membrane comprises at least one insulating support layer and a metal-based layer positioned adjacent the support layer. The metal-based layer has a thickness of less than about 1 $\mu$m. The system also comprises at least one fuel cell integrated with the gas separation membrane. Another aspect of the invention provides a chemical microreactor. The microreactor comprises a membrane having at least one insulating support layer positioned adjacent a metal-based layer. The metal-based layer has a thickness of less than about 1 $\mu$m. The metal-based layer has two opposing sides where each side is an active surface capable of catalyzing a chemical reaction. A source of a diffusing species is directed toward one side and a source of at least one reagent is also directed toward one side.

Another aspect of the invention provides a device incorporating a separation micromembrane. The device comprises a membrane having at least one insulating support layer positioned adjacent a metal-based layer. The metal-based layer has a thickness of less than about 1 $\mu$m and has two opposing sides. Each side is an active surface capable of catalyzing a chemical reaction. The device also comprises a source of a diffusing species directed toward one side.

Another aspect of the invention provides an article comprising a membrane including at least one support layer and a metal-based layer positioned adjacent the support layer. The metal-based layer has a thickness of less than 1 $\mu$m and is capable of performing gas separation. The article also comprises a heating element positioned on the membrane.

Another aspect of the invention provides an article comprising at least one support layer containing fabricated holes. The holes have an average size of less than about 1 $\mu$m. A metal-based layer is positioned adjacent the support layer, the metal-based layer having a thickness of less than about 1 $\mu$m.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

The present invention features micromembranes that include an active, metal-based layer having a thickness of less than about 1 $\mu$m. The micromembrane can be used as a separation membrane and/or as a catalyst for performing highly selective hydrogenation and dehydrogenation reactions. Such small dimensions allow the microfabrication of this membrane onto silicon chip supports and consequently integration of the membrane with a variety of devices can result to provide portable power generation systems and chemical microreactors.

The present invention deals with membranes that comprise a solid layer material, such as a metal layer, or a porous material which can result from depositing metal onto a porous substrate such as porous silicon or a porous ceramic. In embodiment (1), a separation membrane that is selective for a particular chemical component allows that chemical component to diffuse through the membrane material while preventing the entry of other chemical components. In embodiment (2), because membranes can comprise a metal surface, they can act as a heterogeneous catalyst. A driving force for membrane separation or catalysis generally involves applying a pressure or concentration gradient across the membrane interface causing components to transport from one region to the other.

In one aspect of the present invention, a membrane is provided where the membrane is a layered material which includes an "active layer" that can effect separation of a particular component from a mixture of components or catalyze chemical reactions. Typically, a membrane functions as an interface where the membrane is positioned between two regions, resulting in spatial isolation of each region from each other. A mixture of components can be placed in one region and a pressure or concentration gradient (i.e., pressure drop) is applied across the membrane, i.e. the region containing the mixture has a higher pressure or concentration than the region on the other side of the membrane. Preferably, the membrane is constructed to allow the passage of a particular component, thus only that component can travel across the membrane to the other region.

The membrane can include an active layer that is porous or non-porous (a solid). In one embodiment, the membrane is a gas separation membrane, effective for separating a particular gas (the "permeable gas") from a gaseous or gas/liquid mixture. When the membrane is a solid, the permeable gas is capable of selectively dissolving into and diffusing through the solid. Hydrogen gas is known to have relatively high diffusion coefficients in metals in comparison to other gases. Thus, in a preferred embodiment, the gas separation membrane is a hydrogen gas separation membrane incorporating a solid, metal-based layer that allows dissolution and diffusion of hydrogen through the layer. Hydrogen flux is approximately inversely proportional to membrane thickness. Thus, an advantage of membranes having a thickness of less than 1 $\mu$m is the relative increase in hydrogen flux per active membrane material compared to conventional gas separation membranes, which can involve film thicknesses on the order of 10 $\mu$m or greater. The metal-based layer can comprise any metal capable of effecting gas separation and/or catalysis, as is known in the art. Preferably, this layer comprises metals selected from the group consisting of platinum, palladium, nickel, ruthenium, rhodium, gold, yttrium, and corresponding alloys thereof. In one embodiment, the metal-based layer is a palladium alloy.

Micromembranes can be economically beneficial. For example, palladium is an expensive heavy metal. Because less palladium is required in a micromembrane, microfabrication can afford a device that achieves a higher efficiency for a potentially lower cost in proportion. The ability to use very thin metal films as active membrane components also enables the use of less expensive metals, such as nickel, in the membrane device.

Theoretically a micromembrane can be fabricated by simply providing metal-based layer having a thickness of less than about 1 $\mu$m. In reality, however, most commercially useful membranes, in use, are subjected to pressure gradients of at least about 1 atm. Thus, a sub-micron thick metal layer would most likely be unable to withstand this pressure difference, consequently resulting in either fracture or complete breakage of the membrane. In addition, the operating conditions of the membrane can involve high temperatures of at least about 200° C.

In one embodiment, the present invention features a unique membrane design that incorporates a sub-micronscale metal-based layer that can withstand pressure drops of at least about 1 atm, more preferably at least about 2 atm, even more preferably at least about 3 atm, even more preferably at least about 4 atm, and more preferably still at least about 5 atm. Higher pressure drops can cause an increase in efficiency for hydrogen removal. Of course, it is understood that an upper limit is dictated by the particular material used and a particular thickness used. The design can involve positioning the metal-based layer adjacent at least one support layer. The support layer preferably has a rigidity and mechanical stability to maintain the metal-based layer as a substantially planar layer that is substantially free of defects and/or fractures. In one embodiment, the support layer is constructed from an insulating material, such as a ceramic. The ceramic can be selected from the group consisting of metal oxides, metal nitrides, metal carbides and mixtures thereof. In another embodiment, the ceramic can be selected from the group consisting of silicon oxide and silicon nitride.

"Positioning the metal-based layer" refers to any physical or chemical process known in the art for depositing metal layers onto a substrate, and "positioned adjacent the support layer", as used herein, refers to an arrangement in a structure made by such a technique. In one embodiment, the metal layer is deposited by a physical deposition process such as electron beam deposition.

In one embodiment, due to the mechanical stability of the support layer and the design features of the membrane of the present invention, the metal-based layer can have a thickness of less than about 1 $\mu$m, preferably less than about 0.5 $\mu$m, more preferably less than about 0.3 $\mu$m, more preferably less than about 0.2 $\mu$m, and more preferably still less than about 0.1 $\mu$m. In one embodiment, the support layer has a thickness of less than about 1 $\mu$m, preferably less than about 0.5 $\mu$m and more preferably less than about 0.3 $\mu$m. In another embodiment, a combination of the metal-based layer with the support layer can result in a membrane having a total thickness of less than about 1 $\mu$m.

In one embodiment, the membrane comprises the metal-based layer being positioned two adjacent insulating support layers. In another embodiment, the membrane comprises first and second support layers in which the first support layer is positioned adjacent the metal-based layer and the second support layer is positioned adjacent the first support layer i.e. the first support layer is sandwiched between the metal-based layer and the second support layer. In another embodiment, the first support layer is silicon oxide and the second support layer is silicon nitride. The membrane may be exposed to operating conditions of high temperature and/or pressure which can cause the support layer to undergo a variety of stresses. One of ordinary skill in the art can choose the particular ceramic that would be most appropriate for the particular operating conditions. The arrangement of layers in the above embodiments can provide a membrane that is constructed to withstand a variety of competing stresses.

Figure 1:
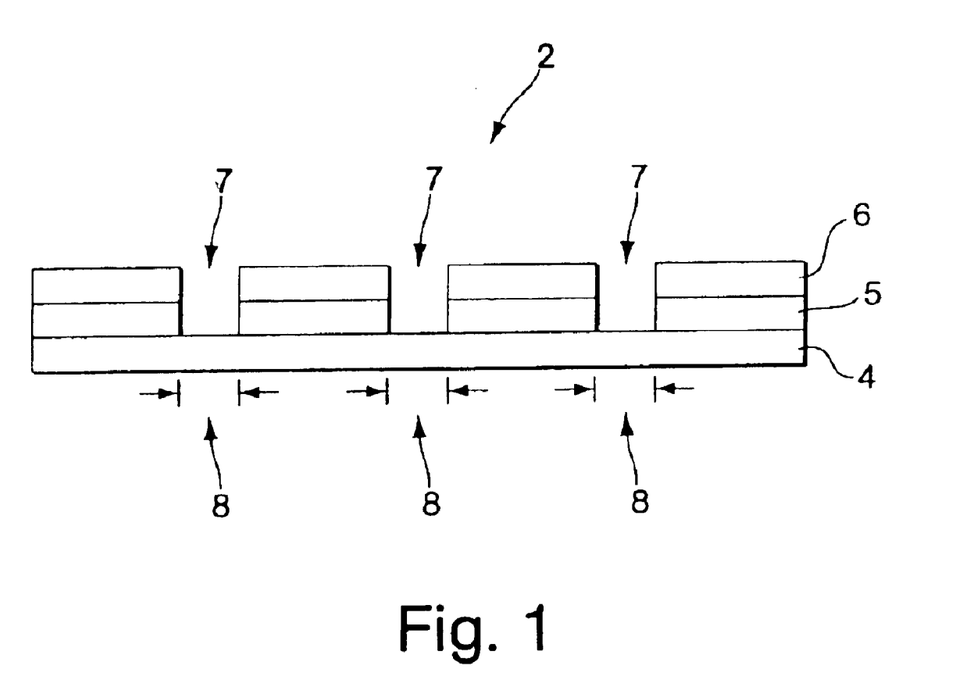
FIG. 1 shows a schematic side view of a double-support-layer/metal-layer sub-micron scale membrane having holes in the support layers.

Positioning the metal-based layer adjacent the support layer can initially result in the metal-based layer having one side completely covered by the support layer. Because the membrane can have uses in separation and/or catalytic applications, the active component of the membrane, i.e. the metal-based layer, requires a portion where a chemical component can enter the membrane on one side (the "entry side") and exit the membrane on the other side (the "exit side"). Thus, the membrane design of the present invention provides a sub-micron scale metal-based layer having portions that can be exposed to chemical components on both sides. In one embodiment, this exposure can be achieved by providing holes on the support layer(s) where the holes penetrate the entire thickness of the support layer(s) thus exposing surfaces on either side of the metal-based layer. This design is exemplified in FIG. 1 for a tri-layer membrane having a metal-based layer positioned adjacent two support layers. In FIG. 1, tri-layer membrane 2 comprises a metal layer 4 having a thickness of less than about 1 $\mu$m. Metal layer 4 is positioned adjacent a first support layer 5 (e.g., silicon oxide) and the first support layer 5 in turn is positioned adjacent a second support layer 6 (e.g. silicon nitride). Holes 7 are provided on support layers 5 and 6 in substantial alignment (completely aligned as illustrated) such that portions 8 of the metal layer have two exposed sides.

By providing a sub-micron scale metal-based layer supported by support layers having holes, the present invention effectively provides the theoretical example discussed above of a metal layer having sub-micron dimensions that can perform gas separation or catalyze chemical reactions. As the hole diameter increases, the membrane of the present invention approaches the theoretical example. Thus, it is another feature of the present invention to provide large hole diameters of average size of at least about 0.1 $\mu$m, preferably at least about 0.5 $\mu$m, more preferably at least about 1 $\mu$m, more preferably at least about 2 $\mu$m and more preferably still at least about 4 $\mu$m.

It is understood that membrane and support layer thicknesses can be tailored for a particular application. For example, applications involving pressure drops of about 1 atm would require thinner membrane layers than applications requiring greater pressure drops, such as a pressure drop of about 5 atm. Accordingly, the thicknesses of the support layers can also be adjusted. The membrane can be tested for hydrogen permeation at various temperatures and pressure gradients to tailor the dimensions to the particular application. For example, applying a hydrogen flux through a palladium film with a 0.1 atm pressure gradient, a 0.2 $\mu$m thick palladium film can achieve a hydrogen flow rate of 200 sccm with a total membrane area of 0.2–2.0 cm$^2$. This area can correspond to 10–100 2 cm long, 200 $\mu$m wide membranes.

The effectiveness of hydrogen diffusion through metals increases with increasing temperature. In a preferred embodiment, the membrane of the present invention is operable at a temperature of at least about 200° C. The membrane operating temperature will depend on the particular application. For example, gas separation can occur at membrane temperatures of between about 200° C. and about 300° C., however, other reactions may require membrane temperatures as high as about 600° C. In one embodiment, the membrane is heated by a heater positioned directly on the membrane. In another embodiment, the heater is positioned on a support layer, where the support layer can function to insulate the metal layer from the heater. In another embodiment where the metal-based layer is positioned adjacent first and second support layers as described previously, the heater can be positioned on the second support layer e.g. the silicon nitride layer. The heater can be a resistive heater and can be fabricated to be integral with the membrane, i.e., removable only by fracture or destruction of the device. "Integral", as used herein, does not include positioned with removable fasteners such as clamps or screws. The heater can be patterned on the membrane by any standard lithographic technique known in the art. The heater pattern can have take a variety of forms. In one embodiment where holes penetrate the support layer, the heater is positioned in the immediate vicinity of the holes to achieve effective heating of the membrane area surrounding the holes.

In conjunction with the heater, the membrane can also possess a temperature sensing device to control the temperature of the membrane. In one embodiment, a temperature sensing device is positioned on the membrane, preferably on the support layer and more preferably on a second support layer. The temperature sensing device can be a temperature sensing resistor or any device that allows temperature control of the membrane operating temperature. In another embodiment, the membrane can incorporate an anemometer which comprises patterned heaters and temperature sensing resistors. The heaters, temperature sensors or anemometers can be patterned using standard lithographic or photolithographic methods.

In another embodiment, a gas sensor is positioned on the membrane, preferably on the insulating layer and more preferably on the second insulating layer. The sensor can be selective for one gas or more than one type of chemical sensor can be used. The gas sensors can be selected from the group consisting of hydrogen sensors, carbon monoxide sensors, oxygen sensors and any combination thereof. For example, when a membrane is integrated with a fuel cell, the membrane can have a hydrogen and carbon monoxide gas sensor. Because it is known that carbon monoxide can poison fuel cells, a carbon monoxide sensor can aid in preventing fuel cell breakdown and thus increase fuel cell lifetimes. The sensors can be solid state sensors such as MOSFET's, which rely on gas diffusion in a solid to the material interfaces. Such solid state sensors can be integrated into the microreactors/micromembrane system using integrated circuit microfabrication steps.

Another aspect of the invention provides an integrated membrane. "Integration" refers to any design that allows the membrane to be operated in conjunction with at least one other membrane or any other device to provide an integrated system that can perform more than one process. The integrated membrane can be designed to operate more than one process either in parallel or in series. For example, a separation throughput of a single micromembrane may not be sufficient for certain applications. Providing a number of membranes operating in parallel can result in an increase of the output. In another embodiment, the membrane or series of membranes can be integrated with another device such as a fuel cell where the membrane can serve to provide a purified gas feed to the fuel cell.

In one embodiment, the integrated membrane can be provided on a silicon chip. In this embodiment, the metal-based layer and adjacent support layers can be fabricated onto a layer of silicon. This aspect is particularly attractive for applications requiring microfabricated, miniaturized devices.

Another aspect of the invention provides a method for microfabricating a membrane. This method takes advantage of the capability to deposit a metal layer having sub-micron thicknesses onto support layers and in addition, the method allows the patterning of holes as previously described. Such miniaturization of the membrane can be provided by a technique broadly known as micro electromechanical systems technology (MEMS). By using MEMS technology, the method involves the steps of providing at least one insulating support layer, depositing a metal-based layer adjacent at least one support layer and patterning holes on the support layer.

In one embodiment, the at least one insulating support layer comprises first and second ceramic layers. Ceramic layers can be deposited by a variety of chemical and physical vapor deposition techniques known in the art. The ceramic layer can be deposited onto a substrate which can either be another ceramic, such as another support layer, or a non-ceramic layer such as silicon. The method can involve positioning the first ceramic layer adjacent the second ceramic layer. In one embodiment, the step of patterning holes can comprise patterning holes on the second ceramic layer only. This method of patterning allows a subsequent deposition of the metal-based layer adjacent the exposed side (the side opposite the second layer) of the first ceramic layer to provide a substantially flat metal-based layer. After deposition of the metal-based layer, holes can then be patterned on the first ceramic layer. In a preferred embodiment, the holes of the first ceramic layer are substantially aligned with the holes of the second ceramic layer to allow portions of the metal-based layer to have exposed surfaces on both sides.

FIG. 2 illustrates one embodiment of the method for fabricating a micromembrane. The embodiment shown in FIG. 2 illustrates a schematic of an integrated membrane where the support layers are positioned on a silicon surface. FIG. 2(a) shows support layers 10 (e.g. silicon nitride) and 11 (e.g. silicon oxide) deposited onto each side of a layer of silicon 12. Silicon layer 12 has two sides; front side 13 and back side 14. In FIG. 2(b), both layers 10 and 11 of a portion of the back side 14 is etched via a dry nitride etch followed by BOE (buffered oxide etch) to expose a surface of a portion of the silicon layer 12 on the back side 14. In FIG. 2(c), support layer 10 on front side 13 is patterned via lithography followed by a dry nitride etch to provide a series of holes 15. In FIG. 2(d) a heater 16 is patterned on layer 10 of front side 13.

Figure 2A:
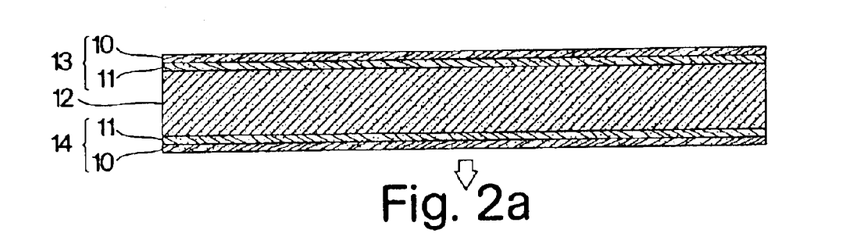
FIG. 2 shows a process for preparing an integrated membrane device supported on a silicon layer.
Figure 2B:
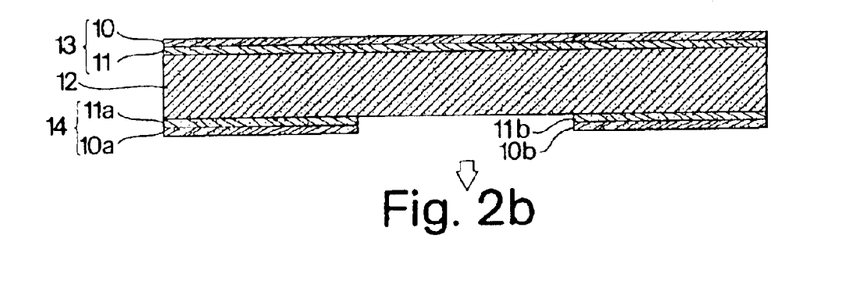
Figure 2C:
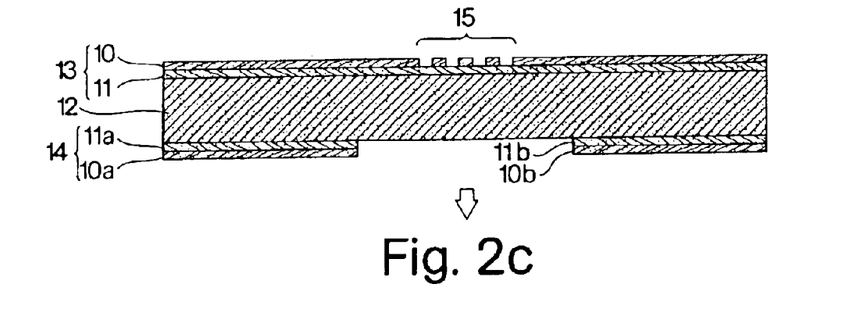
Figure 2D:
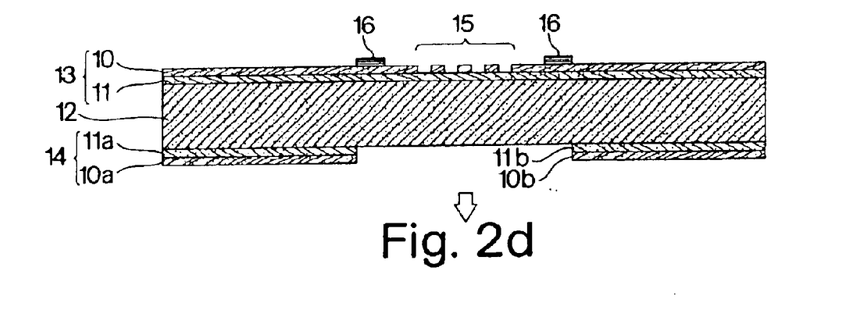
Figure 2E:
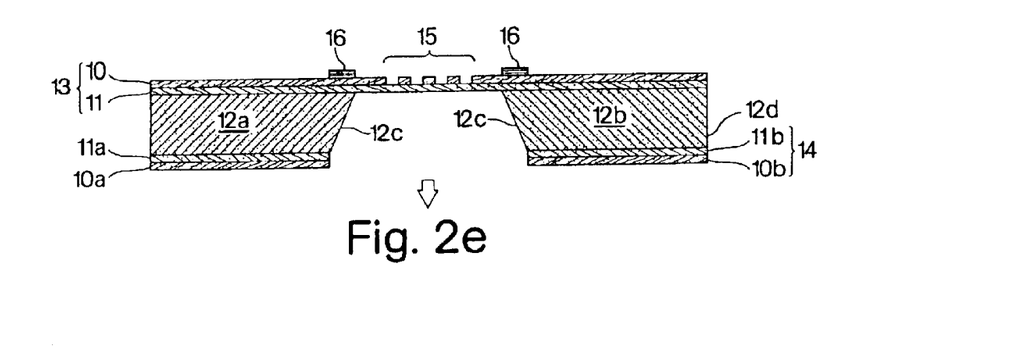

Deposition of the metal-based layer is performed on the back side 14 of silicon layer 12. In FIG. 2(e), the portion of silicon exposed on the back side is etched with KOH to expose a surface of layer 11 in back side 14. As a result, the membrane comprises first and second end portions at back side 14 in which the first and second end portions are positioned adjacent a top surface of respective first and second silicon wafer supports 12a and 12b. First and second silicon wafer supports 12a and 12b further comprise inner and outer surfaces, respectively 12c and 12d. A bottom surface of respective silicon wafer supports 12a and 12b are positioned adjacent first and second silicon oxide layer portions 11a and 11b. Accordingly, first and second silicon nitride layer portions 10a and 10b are positioned adjacent the respective silicon oxide layer portions 11a and 11b.

Figure 2F:
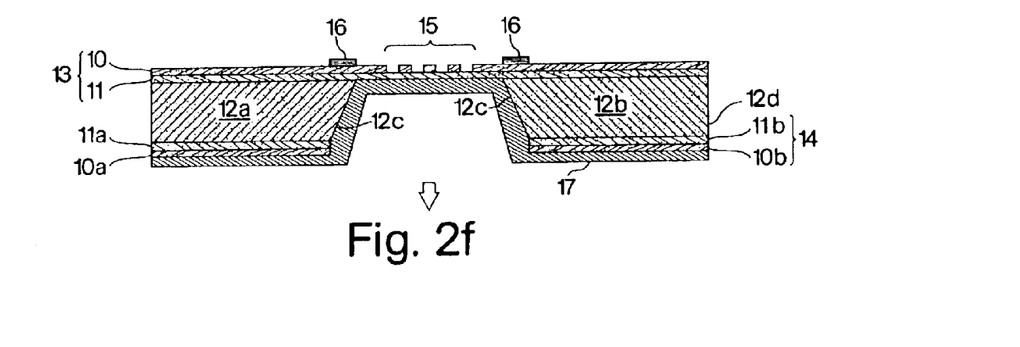
Figure 2G:
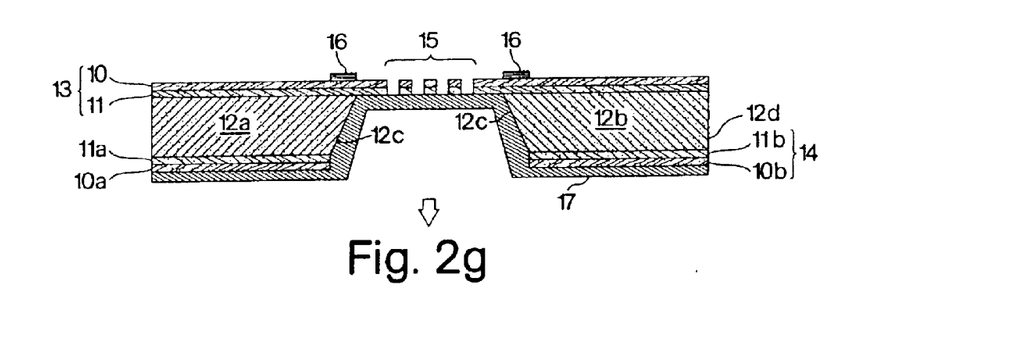

A metal-based layer 17 such as palladium can then be deposited onto support layer 11 of back side 14 by, for example, electron beam deposition to achieve positioning of the metal layer adjacent support layer 11, as shown in FIG. 2(f). Preferably, metal-based layer 17 is deposited with a thin Ti film serving as an adhesion layer (not shown). The result is a continuous metal-based layer 17 positioned adjacent inner side surfaces 12c, first and second silicon nitride layer portions 10a and 10b, the metal-based layer 17 being integral with the metal-based layer of the membrane. After release of the metal-based layer (FIG. 2(g)), the membrane can be optionally packaged by positioning the backside 14 onto an aluminum plate 18 which contacts the portion of the metal-based layer 17 positioned adjacent the first and second silicon nitride layer portions 10a and 10b (FIG. 2(h)). The aluminum plate 18, in conjunction with the back side 14 forms channel 19.

In one embodiment, device further comprises a second channel formed by positioning a capping wafer on the membrane. The second channel is the result of a design for micromembrane packaging. The capping wafer is constructed and arranged so as to form a channel upon being positioned adjacent the membrane. The capping wafer can be formed from an epoxy by using a PDMS casting process. In one embodiment, the epoxy is a UV curable epoxy. An advantageous feature of a capping wafer is ease of fabrication and optical transparency. Previously, however, alignment of the membrane chip with the epoxy elements was performed by hand, device by device. This alignment is cumbersome. The epoxies could contaminate the membrane are or plug the holes. It can also be difficult to achieve a good seal between the membrane and the capping wafer. Without a good seal, above atmospheric hydrogen pressures cannot be used to increase the hydrogen flux through the membrane.

Figure 2H:
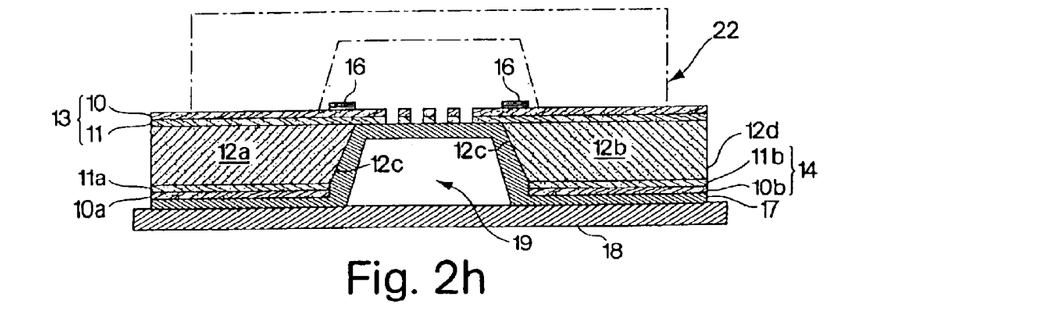

Another advantageous feature of the present invention provides a capping wafer formed from standard silicon wafer processes. A silicon wafer is covered with a layer of nitride to serve as a KOH mask. The nitride is patterned on the front and back sides and the whole wafer is etched with 20% KOH, resulting in a capping structure as shown in FIG. 2(h). The resulting capping wafer possesses channels of about 250 μm deep, with an inlet and an outlet port accessing the channel from the top side, and access holes for probes etched all the way through the wafer.

Figure 3A:
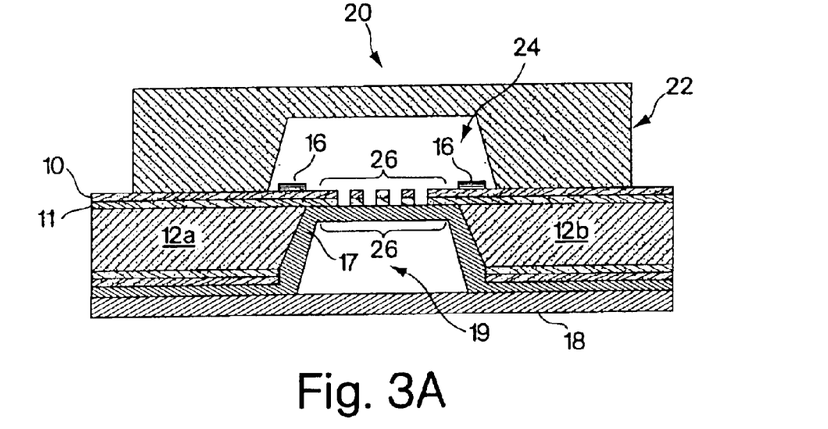
FIG. 3A shows a side view of the silicon device of FIG. 2.
Figure 3B:
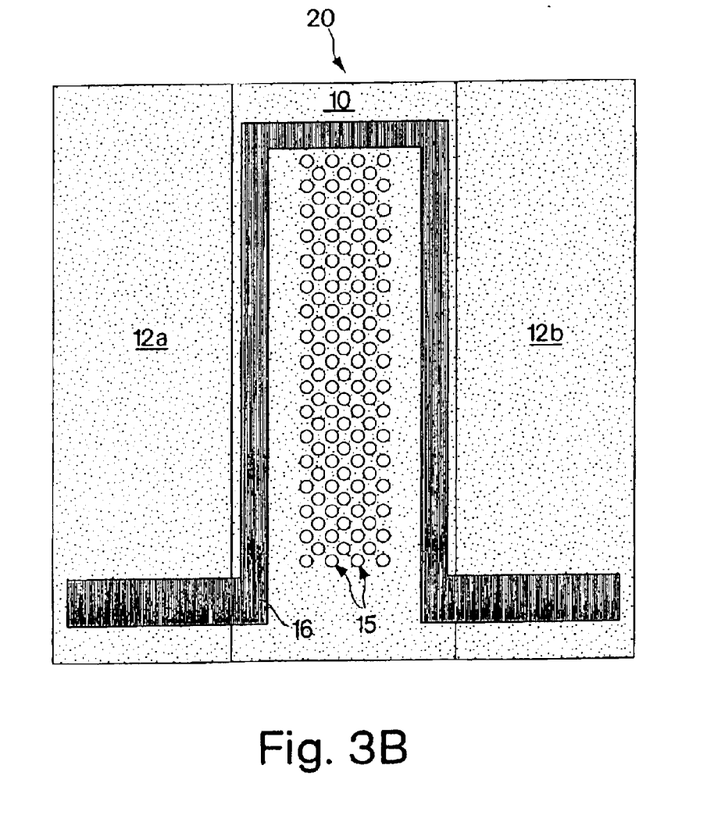
FIG. 3B shows a top view of the silicon device of FIG. 2.

In FIG. 3A, a side view of the device 20 is shown, which is the device of FIG. 2(h) including a capping wafer 22. Device 20 comprises two flow channels, 19 and 24 separated by membrane 26. Membrane 26 comprises three layers: silicon nitride layer 10, silicon oxide layer 11 and palladium layer 17. Nitride and oxide layers 10 and 11 serve as a structural support for palladium layer 17 and electrically insulate palladium layer 17 from heater 16. A corresponding top view of device 20 is shown in FIG. 3B (without the capping wafer 22). As can be seen from FIG. 3B, a variety of hole and heater patterns can be envisioned. In the example of FIG. 3B, heater 16 is patterned to surround the perimeter of the holes 15.

The embodiments of the membrane, as exemplified by FIGS. 2 and 3, illustrate the series of holes as being localized in a particular region of the device. This localization results in another advantageous feature of the membrane of the present invention in that the active portion of the membrane can be thermally isolated from the rest of the device. The advantage of "thermal isolation," can be seen when the "active portion" of the membrane is heated to high temperatures such as a temperature of at least about 200° C., while the non-active portion of the membrane remains substantially cooler. The "active portion" refers to the area where separation or catalysis occurs i.e. the area surrounding the holes. The "non-active portion" refers to the remaining portion of the membrane that is not heated. Thermal isolation can protect excessive heat from affecting other elements positioned on the non-active portion of the membrane, e.g. heaters and sensors, or other devices integrated with the membrane.

Thermal isolation of the active portion can also provide another advantageous feature of micromembranes over conventional large scale membranes, in that the response times of the micromembranes are substantially reduced. Only the active portion is effectively heated and thus heat loss via heat conduction to other portions of the membrane can be substantially eliminated, resulting in increased membrane efficiency. In addition, the small size of the micromembrane components require the heating of only a correspondingly small amount of active portion material. With conventional large scale technology, often the time required for the significantly larger membrane to heat up could be one limiting factor in the operational speed of the device. The combination of a small amount of active membrane material and the thermal isolation of the active portion can result in a thermal response time of less than about 10 ms. "Thermal response time" is the time required to heat up the active portion of the membrane to an operable temperature, for example 200° C. Reducing thermal response time can consequently reduce the response time of any device incorporating a membrane of the present invention.

In another embodiment, the membrane can be incorporated into a valving device. The valving device can allow hydrogen to permeate the membrane under certain operating conditions, such as temperature. For example, when the membrane is heated to an operable temperature, such as 200° C., hydrogen can efficiently permeate the membrane. Allowing the membrane to cool to a temperature, such as room temperature, can substantially decrease the efficiency of hydrogen diffusion through the membrane, and thus hydrogen flow through the membrane is substantially restricted. Because the membrane can be thermally isolated, the "on/off" operation can occur within a relatively fast time scale such as times of less than about 10 ms.

In another embodiment, the valving device can be incorporated in conjunction with a hydrogen reservoir. For example, the reservoir can be constructed such that the membrane provides a potential opening for hydrogen gas to enter in and out of the reservoir. In this example, the reservoir can contain a vacuum, i.e., the reservoir contains a very low gas pressure. Allowing the membrane to contact a hydrogen gas source and heating the membrane to an operable temperature such as 200° C., can cause a purified form of hydrogen gas to enter the reservoir. The reservoir can be pressured to any desired amount of hydrogen gas, as limited by the membrane and/or reservoir structural stability. Upon cooling the membrane to a lower temperature, such as room temperature, entry of hydrogen into the reservoir will be restricted. In one embodiment, the reservoir can be pressurized with hydrogen to a pressure of greater than one atmosphere. Heating the membrane to a temperature of at least about 200° C. can cause hydrogen to exit the reservoir. The reservoir can be constructed of any materials sufficient for use as a hydrogen reservoir.

Another aspect of the invention provides a method for catalyzing a chemical reaction with a micromembrane. In this aspect, the membrane includes a highly active metal surface having a sub-micron scale thickness that can effect the catalysis of a variety of chemicals reactions. For example, heterogeneous catalysis in general involves metal surfaces that can activate chemical components that are in contact with the metal surface. When the heterogeneous catalysis involves a reaction between one gaseous reagent and a non-gaseous reagent, the gas typically is provided in a large excess relative to the non-gaseous reagent. When the non-gaseous reagent comprises an impure mixture, selectivity of the final products may suffer. An advantage of performing catalysis with membranes involves the feature of providing a purified gas source through the exit side of the membrane via a steady constant stream. Kinetic selectivity may be achieved by providing a reagent capable of reacting with the purified gas on the exit side of the membrane in a large excess.

In one embodiment, the membrane is capable of catalyzing a dehydrogenation reaction or a hydrogen generating reaction. Hydrogen generating reactions can be useful in a variety of applications and, in particular, in applications requiring a source of hydrogen gas. Hydrogen gas is difficult to store in small volumes due to its low compressibility. By providing a hydrogen generating microreactor, a more compressible reagent capable of generating hydrogen can be stored in a small volume and can be caused to react when hydrogen is needed. This embodiment provides the advantage that the resulting dehydrogenated product can be separated from the released hydrogen gas because the membrane can also function as a separation membrane which allows hydrogen gas to permeate the membrane and become effectively isolated from the dehydrogenated product. The method can involve contacting a surface of the membrane with a reagent capable of being dehydrogenated, the reagent being selected from the group consisting of alkanes, alkenes, alcohols, ammonia and substituted derivatives thereof. "Substituted derivatives" encompass the replacement of certain atoms of the reagent by other atoms such as replacement of at least one hydrogen by a hydrocarbon radical, a heteroatom or a heteroatom-based group such as nitro, amino, thiolato, or the replacement of a carbon atom by a heteroatom.

An example of a hydrogen generating reaction is a reaction involving a conversion of an alkane to an alkene. Another example of a hydrogen generating reaction is partial dehydrogenation of hydrocarbons. Partial dehydrogenation is an attractive reaction because the dehydrogenated fuel can be stored, rehydrogenated, and recycled, resulting in very low emissions:

cyclohexane→cyclohexene+$H_2$ cyclohexene→$C_6H_6$+$3H_2$ isopropyl alcohol→acetone+$H_2$ These reactions are endothermic (can require temperatures between 300° C.–500° C.) and are typically performed over metal catalysts such as palladium. In all these examples, the reaction can occur on the surface of a micromembrane, allowing purification of the released hydrogen gas.

In another embodiment, the hydrogen generating reaction can be performed over a heterogeneous metal catalyst and the generated hydrogen can subsequently be passed through a membrane of the present invention to provide a purified hydrogen gas source. One example of a hydrogen generating reaction can involve ammonia as a reactant:

$2NH_3 \to N_2 + 3H_2$

Several metals, such as iron or iridium, are effective for catalyzing ammonia decomposition reactions.

An example of a hydrogen generating reaction involving a second reactant, oxygen, is methane partial oxidation. This reaction is an exothermic reaction which has the advantage of requiring much less feedback of power to operate the chemical reaction which can potentially eliminate the need for external heat sources. High operating temperatures are typically required. Again, these reactions can be performed in conjunction with a separation membrane of the present invention to provide a purified hydrogen gas source. This reaction is preferably performed over a heterogeneous catalyst and can be integrated with a separation membrane of the present invention.

$$2CH_4 + O_2 \rightarrow 2CO + 4H_2$$

Methanol is an attractive hydrogen generation fuel because of ease of storage and handling. Steam reforming of methanol occurs in the presence of a heterogeneous catalyst and involves water as a second reagent. This reaction is frequently used in hydrogen generation systems and has been previously proposed for automotive applications:

$$CH_3OH + H_2O \rightarrow CO_2 + 3H_2$$

In another embodiment, the micromembrane is capable of catalyzing a hydrogenation reaction. Membrane catalysis offers an advantage in that a purified source of hydrogen can be provided via a steady stream. As a first step, an impure mixture of hydrogen gas can be caused to contact the entry side of the membrane. A hydrogen selective membrane allows only hydrogen gas to dissolve into the membrane and diffuse through the membrane. In this embodiment a source of hydrogen gas and a reagent capable of being hydrogenated is contacted with a surface of the active portion of the membrane, i.e., the metal-based layer. The reagent capable of being hydrogenated can be selected from the group consisting of alkanes, alkenes, alkynes, aldehydes, carbon monoxide, alcohols, and substituted derivatives thereof. "Substituted derivatives" encompass the replacement of certain atoms of the reagent by other atoms such as replacement of at least one hydrogen by a hydrocarbon radical, a heteroatom or a heteroatom-based group such as nitro, amino, thiolato, or the replacement of a carbon atom by a heteroatom.

Typical hydrogenation reactions can include the conversion of an alkene to an alkane. When the reagent capable of being hydrogenated is a heterocyclic compound, the reaction can involve the equation:

$$furan + H_2 \rightarrow tetrahydrofuran$$

An additional advantage of the micromembranes of the present invention provides: (1) an ability to perform different chemical processes e.g. separation and catalysis; and (2) a capability to integrate these different processes within a single device. Thus, another aspect of the present invention provides a micromembrane integrated with at least one device. For example, many microreactor-related applications may require a separation step to be performed in conjunction with a catalysis step. An example of such an integrated device can comprise one separation membrane operating in conjunction with a catalysis membrane. In this example, the resulting products of the catalysis can be separated from the reactants, or alternatively, a separation membrane can be used to provide a purified source of a chemical reactant, such as hydrogen gas. Other integrated processes can include a combustion chamber that can generate chemical energy to drive endothermic catalysis reactions.

Figure 4:
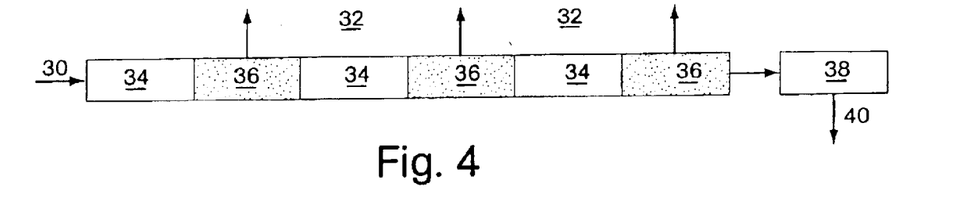
FIG. 4 shows a schematic example of an integrated reactor/separation system comprising alternating reactors and separation membranes.
Figure 5:
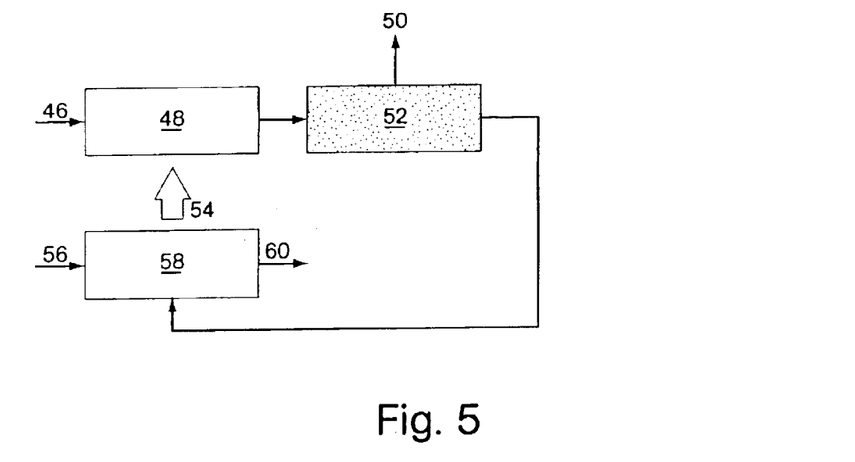
FIG. 5 shows a schematic example of an integrated reactor/separation system highlighting the use of a heat generation reactor.
Figure 6:
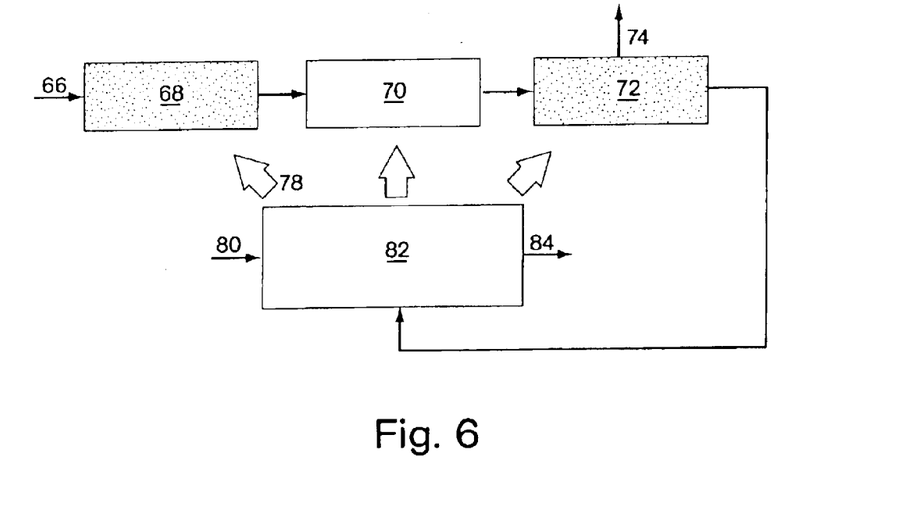
FIG. 6 shows a schematic example of integrated reactor/separation system showing the various possible combinations of integrated processes, including an evaporator for liquid fuels.

Examples of integrated processes are shown schematically in FIGS. 4–6. For example, if fuel conversion is equilibrium limited, such as in ammonia decomposition, it may be desirable to incorporate a design include alternating reaction and separation membranes, as shown in FIG. 4. In FIG. 4, feed 30 is introduced through an alternating series of reaction membranes 34 and separation membranes 36. In addition, treatment of an exiting hydrogen-poor stream, which contains hydrogen, other reaction products and unreacted fuel, can be treated in exhaust processing reactor 38 resulting in cleaner emission 40. Removal of hydrogen gas 32 between reactor membranes 34 can be provided to allow fuel conversions beyond the equilibrium value.

FIG. 5 shows an example where a hydrogen stream can be recycled to a combustion portion of the reactor to use the resulting heat to feed the hydrogen generating reaction. The amount of fresh fuel to be burned can then be reduced. Post-separation processes may be important in the case of partial oxidation reactions, where large amounts of carbon monoxide are produced. Another reactor segment may be necessary to perform catalysis reactions such as the oxidation of carbon monoxide to carbon dioxide prior to emission. In FIG. 5, fuel and air enter reactor 58 where resulting heat 54 is used to heat hydrogen generation device 48, which is fueled by feed 46. Separation membrane 52 can be used to separate hydrogen 50.

FIG. 6 shows a schematic of various combinations of integrated processes where the fuel is a liquid fuel. The device includes an evaporator 68, hydrogen generating device 70 and separation membrane 72 to separate off hydrogen 74. A combustion reactor 82, using fuel and air 80, can supply heat 78 for any or all of the evaporation, hydrogen generation or separation processes.

Figure 7:
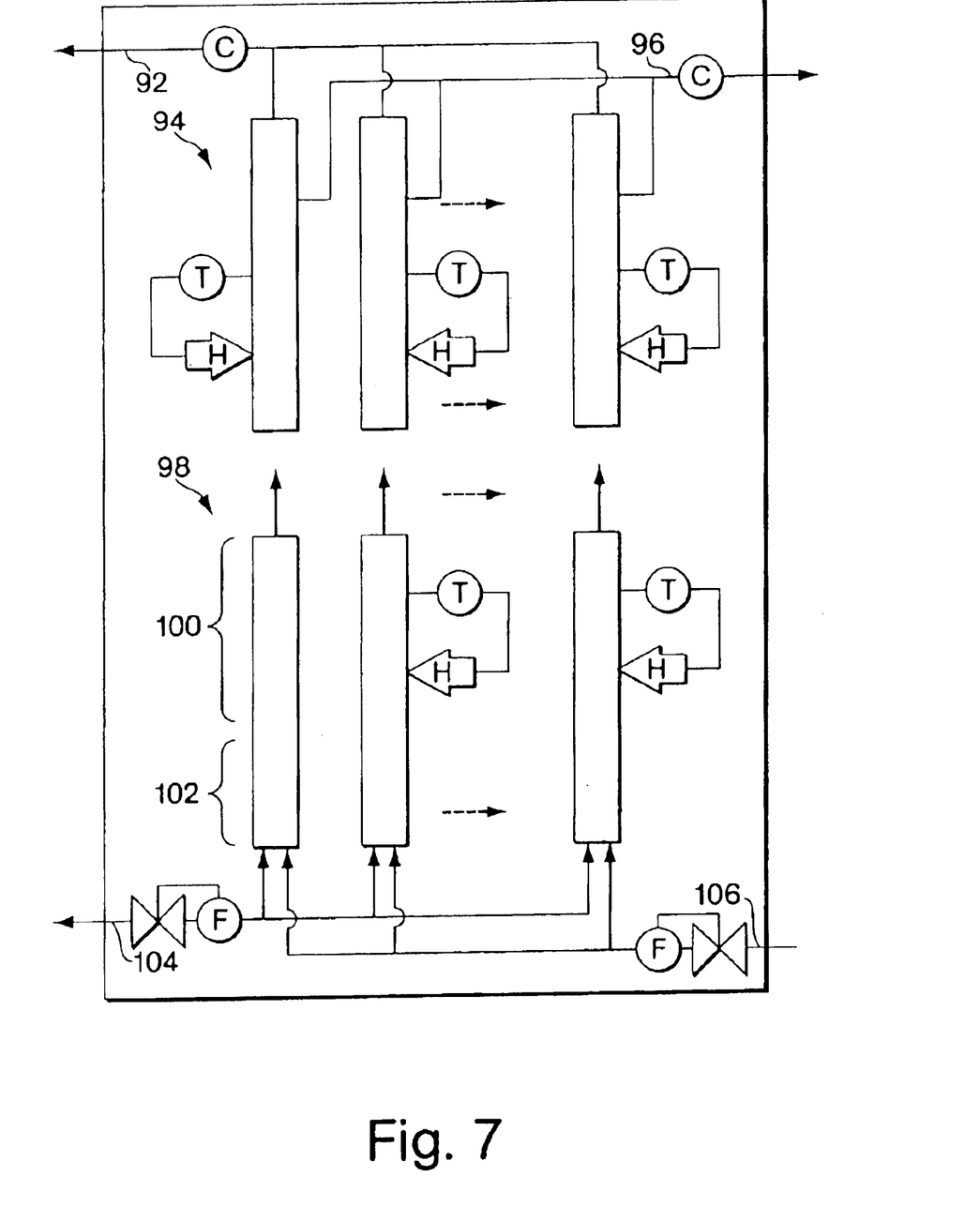
FIG. 7 shows a schematic of a microfabricated integrated device incorporating a number of reactor/membrane systems operating in parallel.

FIG. 7 shows an example of a microfabricated reactor/membrane system multiplexed into networks in a single device. These reactor/membranes can be designed to operate in parallel to expand the production capability. FIG. 7 includes membranes 94, reactors 98, reaction zone 100, and mixing zone 102. Purified hydrogen, 96 exits in the direction indicated by the arrow, whereas $CO_2$ and $H_2O$ gases 92 exit in an opposite direction. Heat (H) can be generated to supply heat for any of the membranes. Feed 104 and 106 is supplied below.

The function and advantage of these and other embodiments of the present invention will be more fully understood from the examples below. The following examples are intended to illustrate the benefits of the present invention, but do not exemplify the full scope of the invention.

EXAMPLE 1

A Micromembrane

A palladium micromembrane was prepared according to the process shown in FIG. 2. In this example, the membrane included a top support layer of silicon nitride (layer thickness=0.3 $\mu$m) positioned adjacent a support layer of silicon oxide (layer thickness=0.2 $\mu$m). This process was developed as provided by the MEMS field. A layer of palladium (layer thickness=0.2 $\mu$m) was deposited adjacent the silicon oxide layer. The holes were patterned by photolithography and have a diameter of 4 $\mu$m and a total width of the device is 700 $\mu$m. Only one heater segment is used in this example. The length of one heater segment is about 3.4 mm.

Figure 8:
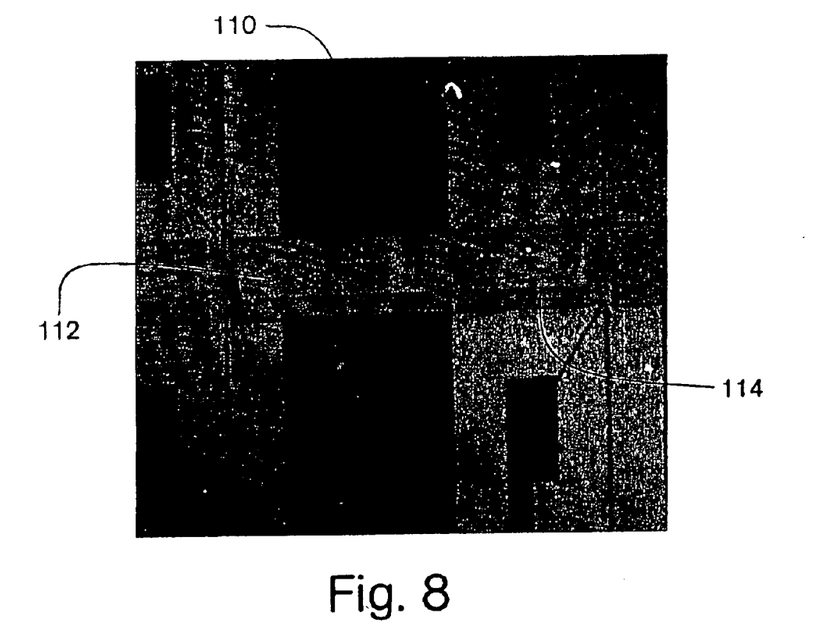
FIG. 8 shows a photocopy of a photograph displaying a top view of a microfabricated silicon chip incorporating the micromembrane.

FIG. 8 shows a photocopy of a photograph displaying a top view of the microfabricated silicon chip incorporating the sub-micron scale membrane. Features of FIG. 8 include composite membrane 114, Pt heater 110 and perforations (holes) in $SiO_2/Si_3N_4$ 112. The channel in the device is 1.2 cm long, and the membrane width is slightly less than 700 $\mu$m. In this example, the heater design is symmetric which allows heating a large area of the membrane while maximizing the area in the center available for perforations or holes and hydrogen flux. A thin TSR is patterned inside the heater loop, and provides a measurement of the average temperature for a given heater segment. There are two independent heater segments for each device. A single device chip measures 0.8×1.6 cm.

Figure 9:
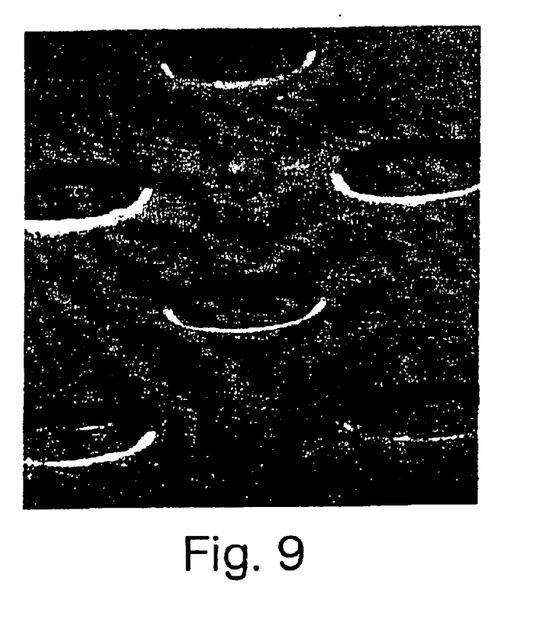
FIG. 9 shows a photocopy of an SEM image of the holes or perforations in the support layers of silicon nitride and silicon oxide and the exposed palladium surface.

FIG. 9 shows a photocopy of an SEM image of the holes or perforations in the support layers. In FIG. 9, the support layers are silicon nitride and silicon oxide and the exposed palladium surface can be observed through the holes.

EXAMPLE 2

Hydrogen Flux Through the Micromembrane

Figure 10:
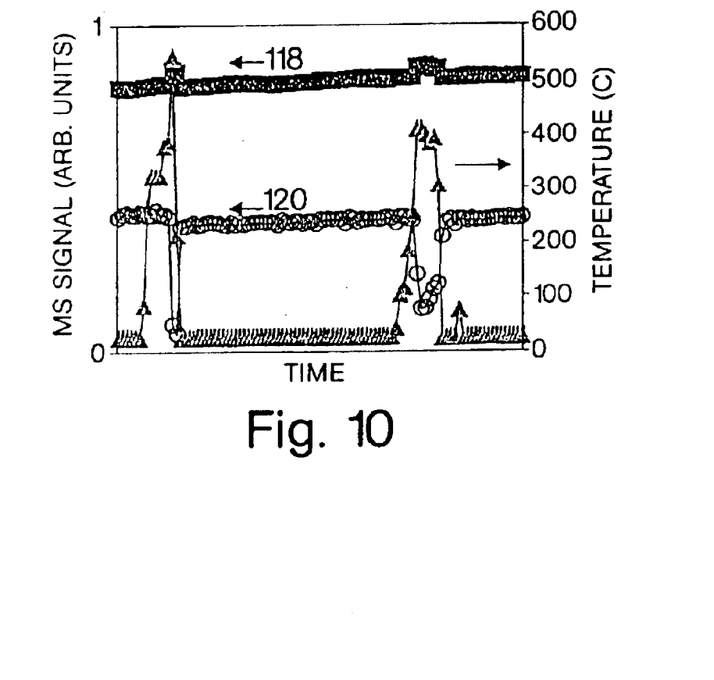
FIG. 10 shows a plot of hydrogen flux from a mixture of 90/10 $N_2/H_2$ at elevated membrane temperatures as a function of time.

FIG. 10 shows a part of a selective flux of hydrogen from a mixture of 90/10 $N_2/H_2$ at elevated membrane temperatures, using the membrane of Example 1. The devices were fixed onto an aluminum plate and mounted on an XYZ stage which contained the gas manifold and allowed for alignment with the flow card. In this experiment, a gas flow of a 9:1 mixture of nitrogen and hydrogen is contacted on one side of the membrane, and a flow of pure argon is contacted on the opposite side. The flow rates on both sides are about 20 sccm ($N_2$ 118 and $H_2$ 120). The composition of the nitrogen/hydrogen mixture exiting the device is monitored using a quadrupole massspectrometer (QMS). The membrane temperature is measured using the temperature sensing resistor on the membrane, and the membrane is heated resistively using the integrated heater and a power supply. When the membrane temperature is elevated, the exit hydrogen concentration drops and the nitrogen concentration increases. The temperature dependent change in the mixture concentration indicates selective hydrogen flux out of the channel through the membrane. A membrane separation factor of over 1800 was determined.

Figure 11:
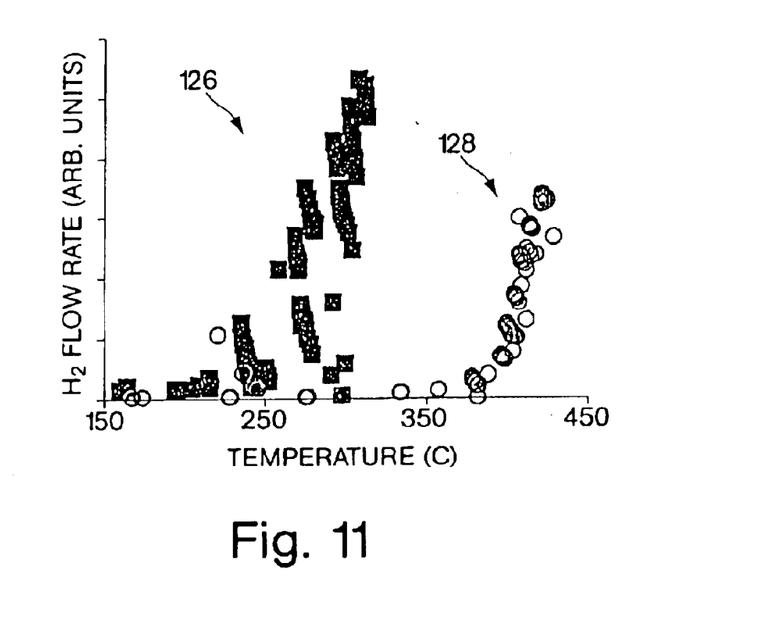
FIG. 11 shows a plot of the dependence of hydrogen flux through a palladium micromembrane on temperature and hydrogen pressure gradient across the membrane.

FIG. 11 shows a plot of the dependence of hydrogen flux through a palladium micromembrane on temperature and hydrogen pressure gradient across the membrane. The experiment in FIG. 11 is slightly different from that of FIG. 10. Here, either a gas flow of pure hydrogen or 9:1 nitrogen/hydrogen mixture is contacted on one side of the membrane, while the other side is maintained under vacuum. The hydrogen partial pressure on the vacuum side is proportional to the hydrogen flux across the membrane. The QMS is used to monitor the hydrogen partial pressure (1 atm $H_2$ 126 and 0.1 Atm $H_2$ 128. The temperature is measured as before and the membrane is heated as before.

EXAMPLE 3

Formation of Silicon Wafer

A silicon wafer is covered with a layer of nitride, to serve as a KOH mask. The nitride on the front and back sides of the wafer is patterned, and the whole wafer is etched with 20% KOH, resulting in a capping structure shown in FIG. 12. The resulting capping wafer possesses about 250 $\mu$m deep channels on one side, with an inlet and an outlet port accessing the channel from the top side, and access holes for probes etched all the way through the wafer.

Figure 12:
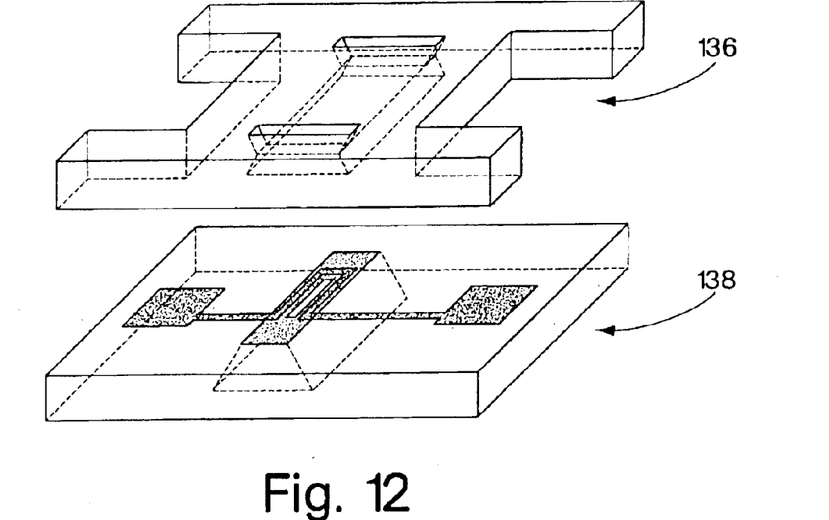
FIG. 12 shows a micromembrane packaging design for wafer-level assembly.

The capping wafer 136 and the membrane 138 can be bonded together prior to dicing, using an adhesive layer, such as an epoxy. The bond was accomplished using a photoresist stamping method. A thin layer (~2 $\mu$m) of photoresist was coated onto a dummy wafer. The capping wafer was briefly contacted with the photoresist, and then aligned and pressed together with the membrane wafer. The wafers were baked at 100 ° C. for 1 h and then the wafers were diced to release individual devices. This approach enables wafer-level assembly of the micromembrane devices, with improved seal and a controlled application of the sealant.

Figure 13:
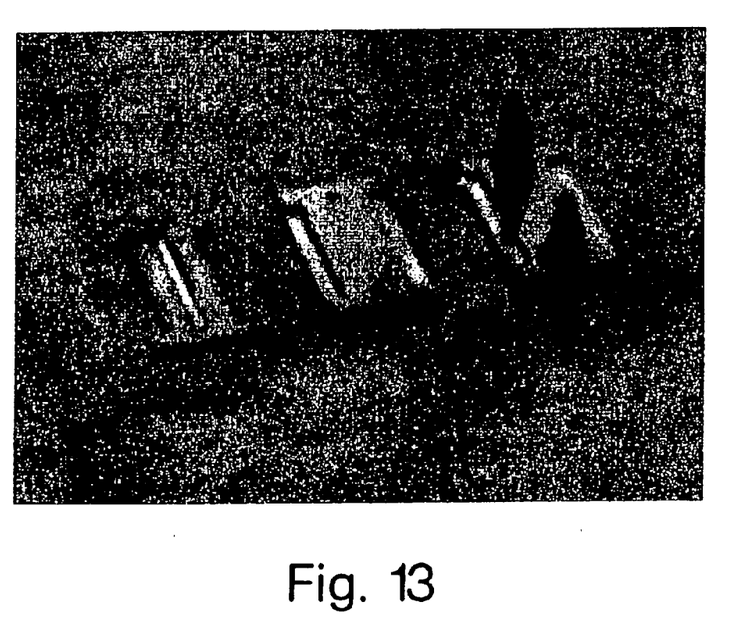
FIG. 13 shows a photocopy of an SEM of membrane devices assembled at wafer level, with and without attached ferrules.

To access the inlet and outlet ports on the device, two 1/16" ferrules (e.g. from Swagelock) were epoxied to the capping chip. The alignment of the ferrules is straight forward, and low temperature materials such as epoxy can be used because of the thermal isolation of the membrane. The ferrules can be used to connect gas inlet and outlets to the device by either gluing standard 1/16" tubing using the ferrule for alignment, or through a compression fitting. The assembled device with and without ferrules, as well as a single capping chip flipped to show the channel, are shown in FIG. 13. Five out of six devices assembled as shown in FIG. 13, showed no leaks up to pressures in excess of 4 atm, which is about the maximum current operating pressure of the membranes. The bottom channel, etched in the silicon chip incorporating the membrane, can also be completed by bonding another silicon wafer with etched fluidic inlet and outlet ports. Until now, the bottom channel was completed by bonding the device onto an aluminum mounting plate.

The wafer bonding can also be accomplished by using other materials including sputtered glass, spin-on glass, polyimides, or thick photoresist as the bonding layer.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A membrane, comprising:
   at least one support layer including at least one hole; and
   a metal-based layer positioned adjacent the at least one support layer, the metal-based layer having a thickness of less than 1 $\mu$m and being capable of performing gas separation or catalysis,
   wherein the at least one hole allows chemical components to access both sides of at least a portion of the metal-based layer.

2. A membrane as in claim 1, wherein the at least one hole has a diameter of at least about 0.1 $\mu$m.

3. A membrane as in claim 1, wherein the at least one hole has a diameter of at least about 0.5 $\mu$m.

4. A membrane as in claim 1, wherein the at least one hole has a diameter of at least about 1 $\mu$m.

5. A membrane as in claim 1, wherein the at least one hole has a diameter of at least about 2 $\mu$m.

6. A membrane as in claim 1, wherein the at least one hole has a diameter of at least about 4 $\mu$m.

7. A membrane as in claim 1, wherein the metal-based layer is a solid layer.

8. A membrane as in claim 7, wherein the solid layer is a palladium alloy.

9. A membrane as in claim 1, wherein the metal-based layer has a thickness of less than about 0.5 $\mu$m.

10. A membrane as in claim 1, wherein the metal-based layer has a thickness of less than about 0.3 $\mu$m.

11. A membrane as in claim 1, wherein the metal-based layer has a thickness of less than about 0.2 $\mu$m.

12. A membrane as in claim 1, wherein the metal-based layer has a thickness of less than about 0.1 $\mu$m.

13. A membrane as in claim 1, wherein the at least one support layer comprises a first ceramic layer positioned adjacent the metal-based layer.

14. A membrane as in claim 13, wherein the at least one support layer further comprises a second ceramic layer positioned adjacent the first ceramic layer.

15. A membrane as in claim 13, wherein the first ceramic layer is selected from the group consisting of metal oxides, metal nitrides, and metal carbides.

16. A membrane as in claim 15, wherein the first ceramic layer is a silicon oxide layer.

17. A membrane as in claim 14, wherein the second ceramic layer is selected from the group consisting of metal oxides, metal nitrides, and metal carbides.

18. A membrane as in claim 17, wherein the second ceramic layer is a silicon nitride layer.

19. A membrane as in claim 1, wherein the at least one support layer has a thickness of less than about 1 μm.

20. A membrane as in claim 1, wherein the at least one support layer has a thickness of less than about 0.5 μm.

21. A membrane as in claim 1, wherein the at least one support layer has a thickness of less than about 0.3 μm.

22. A gas separation membrane, comprising:
at least one support layer;
a metal-based layer positioned adjacent the at least one support layer, the metal-based layer having a thickness of less than 1 μm and being capable of performing gas separation or catalysis; and
a heater in thermal communication with the at least one support layer, the heater able to heat the at least one support layer to a temperature of at least about 200° C.

23. A membrane as in claim 22, wherein the heater is able to heat the at least one support layer to a temperature of at least about 300° C.

24. A membrane as in claim 22, wherein the heater is able to heat the at least one support layer to a temperature of at least about 600° C.

25. A valving device at a specific, predetermined temperature, comprising a gas separation membrane having at least one support layer and a metal-based layer positioned adjacent the at least one support layer, the metal-based layer having a thickness of less than 1 μm and being capable of performing gas separation or catalysis, wherein, at a temperature of at least about 200° C., a hydrogen flow exists across the membrane and at a temperature of less than about 200° C., the hydrogen flow is nonexistent.

26. A valving device as in claim 25, where the valving device is an opening for a gas reservoir.

27. A method for fabricating a gas separation membrane, comprising:
providing at least one insulating support layer;
patterning holes in the at least one support layer; and
depositing a metal-based layer adjacent the at least one insulating support layer, wherein the metal-based layer has a thickness of less than about 1 μm.

28. A method as in claim 27, wherein the at least one insulating support layer comprises a first and a second ceramic layer, the first ceramic layer adjacent the second ceramic layer.

29. A method as in claim 28, wherein the step of patterning holes comprises patterning holes in the second ceramic layer only.

30. A method as in claim 29, wherein the depositing step comprises depositing the metal-based layer adjacent the first ceramic layer.

31. A method as in claim 30, further comprising patterning holes on the first ceramic layer after depositing the metal-based layer, wherein the holes of the first ceramic layer are substantially aligned with the holes of the second ceramic layer.

32. A method as in claim 31, further comprising patterning a heater on the second ceramic layer.

33. A method as in claim 27, wherein the providing step comprises providing the at least one insulating support layer on a silicon surface.

34. An article comprising:
at least one support layer containing fabricated holes of an average size less than 1 μm; and
a metal-based layer adjacent the at least one support layer having a thickness of less than 1 μm.

35. A device comprising:
a gas separation membrane comprising at least one support layer having a first ceramic layer and a second ceramic layer positioned adjacent the first ceramic layer, the membrane further comprising a metal-based layer positioned adjacent the first ceramic layer, the metal-based layer having a thickness of less than 1 μm and being capable of performing gas separation or catalysis,
wherein the first and second ceramic layers comprise a front side of the membrane, the membrane further comprising first and second end portions at a back side of the membrane, the first and second end portions being positioned adjacent a top surface of respective first and second silicon wafer supports.

36. A device as in claim 35, further comprising first and second silicon oxide layer portions positioned adjacent an opposing bottom surface of the respective first and second silicon wafer supports.

37. A device as in claim 36, further comprising first and second silicon nitride layer portions positioned adjacent the respective first and second silicon oxide layer portions.

38. A device as in claim 37, wherein the first and second silicon wafer supports comprise inner and outer side surfaces, the device further comprising a continuous metal-based layer positioned adjacent the inner side surfaces of the first and second silicon wafer supports.

39. A device as in claim 38, wherein the first and second silicon nitride layer portions are integral with the metal-based layer of the membrane.

40. A device as in claim 39, further comprising an aluminum plate contacting the portion of the continuous metal-based layer positioned adjacent the first and second silicon nitride layer portions so as to form a channel.

41. A device as in claim 40, wherein the metal-based layer of the membrane is a palladium alloy.

42. A device as in claim 40, further comprising a capping wafer positioned adjacent the front side of the membrane, the capping wafer being constructed and arranged so as to form a second channel upon being positioned adjacent the membrane.

43. A device as in claim 42, wherein the capping wafer comprises an epoxy-molded wafer.

44. A device as in claim 42, wherein the capping wafer comprises a silicon wafer.

* * * * *